US008458609B2

(12) United States Patent
Wilairat

(10) Patent No.: US 8,458,609 B2
(45) Date of Patent: Jun. 4, 2013

(54) MULTI-CONTEXT SERVICE

(75) Inventor: Weerapan Wilairat, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 214 days.

(21) Appl. No.: 12/566,402

(22) Filed: Sep. 24, 2009

(65) Prior Publication Data
US 2011/0072393 A1    Mar. 24, 2011

(51) Int. Cl.
*G06F 3/048* (2006.01)
*G06F 3/033* (2006.01)
*G06F 3/041* (2006.01)

(52) U.S. Cl.
USPC .......................... 715/769; 715/863; 345/173

(58) Field of Classification Search
USPC ............... 715/764, 770, 810, 811, 813, 863, 715/864, 769, 745, 744, 747, 788, 789; 345/173
See application file for complete search history.

(56) References Cited

U.S. PATENT DOCUMENTS

| | | | |
|---|---|---|---|
| 6,664,991 B1 | 12/2003 | Chew et al. | |
| 7,058,902 B2 | 6/2006 | Iwema et al. | |
| 7,158,123 B2 | 1/2007 | Myers et al. | |
| 7,865,841 B2* | 1/2011 | Morikawa ..................... | 715/811 |
| 2002/0163543 A1 | 11/2002 | Oshikiri | |
| 2006/0246955 A1 | 11/2006 | Nirhamo et al. | |
| 2007/0247435 A1* | 10/2007 | Benko et al. ................. | 345/173 |
| 2008/0313568 A1* | 12/2008 | Park et al. ..................... | 715/835 |
| 2009/0083663 A1* | 3/2009 | Kim ............................. | 715/811 |
| 2010/0146425 A1* | 6/2010 | Lance et al. .................. | 715/769 |

OTHER PUBLICATIONS

Esenther, et at."Fluid DTMouse: Better Mouse Support for TouchBased Interactions", Retrieved at <<http://www.merl.com/reports/docs/TR2006-001.pdf>> AVI'06, May 23-26, 2006, Venezia, Italy, pp. 112-115.
Vallerio, et al. "Energy-Efficient Graphical User Interface Design", Retrieved at <<http://www.cc.gatech.edu/classes/AY2007/cs7470__fall/zhong-energy-efficient-user-interface.pdf>>, IEEE Transactions on Mobile Computing , Jul. 2006 , vol. 5, Issue 7, pp. 846-859.
Nordgren, Peder, "Development of a Touch Screen Interface for Scania Interactor", Retrieved at <<http://www.cs.umu.se/education/examina/Rapporter/PederNordgren.pdf>> Apr. 10, 2007, pp. 67.

* cited by examiner

*Primary Examiner* — Haoshian Shih
(74) *Attorney, Agent, or Firm* — Wolfe-SBMC

(57) ABSTRACT

A multi-context service is described. In embodiments, a first input on a touch-screen of a portable device is detected as a selection of an object icon displayed on the touch-screen. A second input on the touch-screen is detected as a selection of an application icon displayed on the touch-screen. The object icon is associated with a content object, and the application icon is associated with a command provider that performs one or more actions on the content object. The content object is associated with the command provider to initiate the command provider to perform at least one of the actions on the content object based on the content object being associated with the command provider.

15 Claims, 4 Drawing Sheets

8,458,609 B2

MULTI-CONTEXT SERVICE

BACKGROUND

Portable devices are increasingly more common and mobile, such as laptop computers, tablet PCs, ultra-mobile PCs, as well as other mobile data, messaging, and/or communication devices. When a user holds a small, portable device such as a tablet PC or ultra-mobile PC that has an integrated touch-screen, a common interaction technique is to hold the device with one hand and interact with the touch-screen with the other hand. For example, users can tap-touch targets, user interface elements, selectable icons, or menu items on a touch-screen.

While portable devices have become more mobile and convenient, the size of device integrated displays has decreased to accommodate the mobility and convenience of the devices. On device displays that are small, application command options that are typically displayed in a menu or list, such as when a user selects an application icon, are not able to be fully displayed, or only a small subset of command options can be displayed at any one time. This can make it difficult for a user to navigate and select application commands that are relevant to a task the user wants to perform on a portable device.

SUMMARY

This summary is provided to introduce simplified concepts of a multi-context service that are further described below in the Detailed Description. This summary is not intended to identify essential features of the claimed subject matter, nor is it intended for use in determining the scope of the claimed subject matter.

A multi-context service is described. In embodiments, a first input on a touch-screen of a portable device is detected as a selection of an object icon displayed on the touch-screen. A second input on the touch-screen is detected as a selection of an application icon displayed on the touch-screen. The object icon is associated with a content object, and the application icon is associated with a command provider that performs one or more actions on the content object. The content object is associated with the command provider to initiate the command provider to perform at least one of the actions on the content object based on the content object being associated with the command provider.

In other embodiments, the command provider automatically performs at least one of the actions on the content object based on a type of the content object that is associated with the command provider. A multi-context service can register an electronic document, image, or other type of data as the content object. The multi-context service can also register a software application as the command provider that performs the one or more actions on the content object. Commands to initiate the command provider to perform the actions on the content object can be displayed in a list in a ranked order from a first command that corresponds to a most likely action to be performed on the content object, to a last command that corresponds to a least likely action to be performed on the content object. The commands can be displayed in the list in the ranked order based on a ranking selected by the multi-context service, a ranking selected by the command provider, or based on a ranking received as user-selectable inputs to the portable device.

BRIEF DESCRIPTION OF THE DRAWINGS

Embodiments of a multi-context service are described with reference to the following drawings. The same numbers are used throughout the drawings to reference like features and components.

DETAILED DESCRIPTION

Embodiments of a multi-context service provide that a user of a portable device can select an object icon on a touch-screen display, and then select an application icon to associate with the object icon. For example, an application icon can represent an email application, a photo viewer, a printer manager, or any other type of software application that is registered with a multi-context service as a command provider. The software application is registered as a command provider for the various actions and/or commands that can be performed on content objects. An object icon can represent an email message, a digital photo, a document, or any other data type that is registered with the multi-context service as a content object.

In one example, an email application (e.g., a command provider) can be associated with an email message (e.g., a content object). The email application can then perform various actions or commands on the email message, such as to open the email message, forward the email message, print the email message, and so on. In another example, a photo viewer application (e.g., a command provider) can be associated with a digital photo (e.g., a content object). The photo viewer application can then perform various actions or commands on the digital photo, such as to open the viewer and display the photo, print the digital photo, open an editor to edit the photo, and so on.

While features and concepts of the described systems and methods for a multi-context service can be implemented in any number of different environments, systems, and/or various configurations, embodiments of a multi-context service are described in the context of the following example systems and environments.

Figure 1:
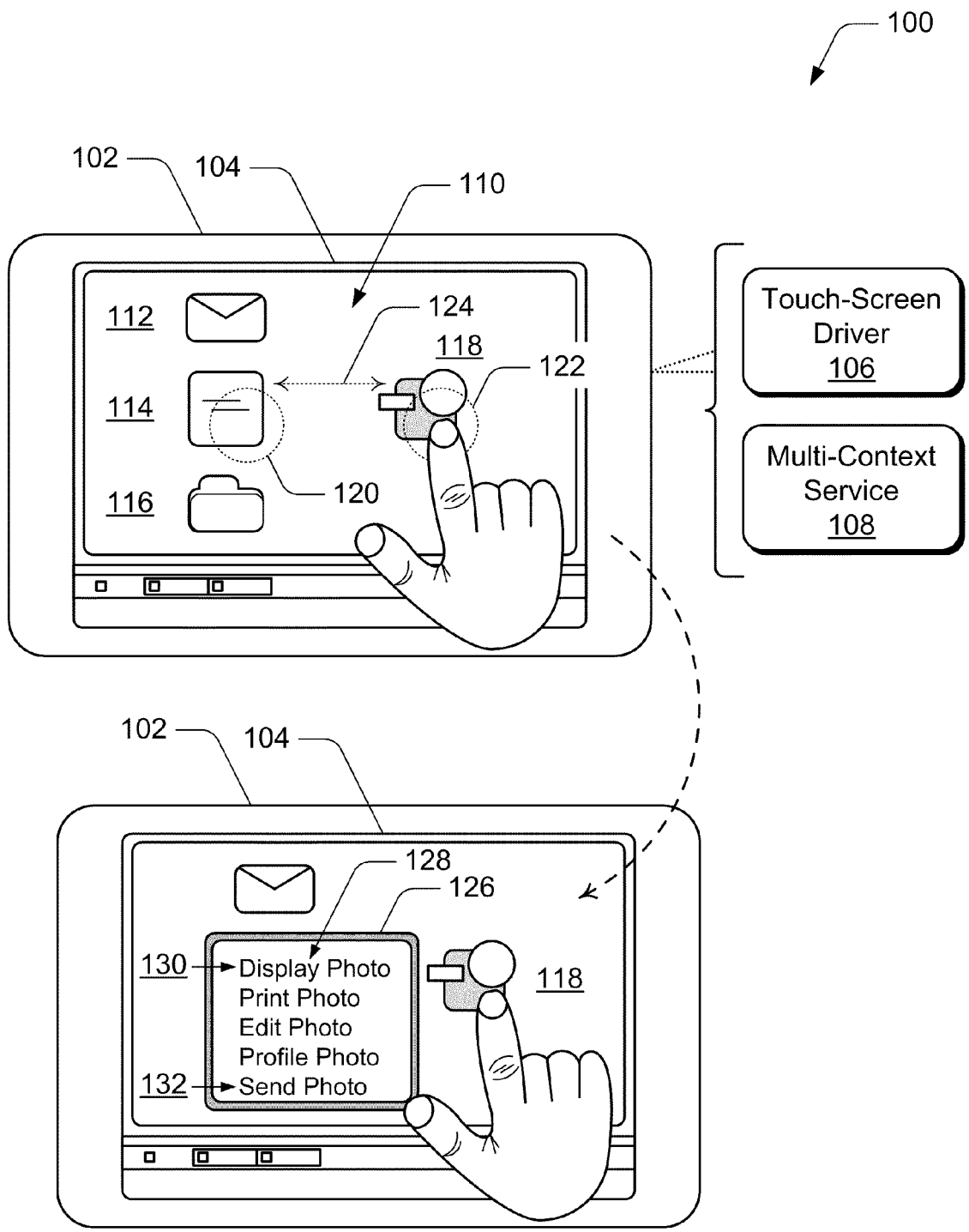
FIG. 1 illustrates an example of a portable device that can implement various embodiments of a multi-context service.

FIG. 1 illustrates an example 100 of a portable device 102 that can implement various embodiments of a multi-context service. Portable device 102 is an example of any of the various types of portable devices described with reference to FIG. 2 and can also be implemented with any number and combination of differing components as described with reference to the example device shown in FIG. 4. Portable device 102 includes an integrated touch-screen 104 to display user interfaces, user interface elements and features, user-selectable controls, selectable icons, various displayable objects, and the like. Portable device 102 also includes at least a touch-screen driver 106 and a multi-context service 108 that may be implemented as a component or module of an operating system on the portable device.

In various implementations, the portable device 102 can be utilized as a music and/or video player, for email communication, text messaging, as a photo viewer, as a portable phone for voice communication, and/or for many other applications. In this example, portable device 102 includes various icons 110 displayed for user selection on the touch-screen 104. For example, a message icon 112 represents an email or text message, an image icon 114 represents a digital photo or image, a document icon 116 represents a document or other user-generated data, and an application icon 118 represents a software application that executes on the portable device 102.

The multi-context service 108 registers command providers and content objects that correspond to the various icons 110 that are displayed on the touch-screen 104 of the portable device 102. For example, the application icon 118 can represent an email application, a photo viewer, a printer manager, or any other type of software application that is registered with the multi-context service 108 as a command provider. The software application is registered as a command provider for the various actions and/or commands that can be performed on content objects. The message icon 112, image icon 114, and document icon 116 all represent content objects, such as an email message, a digital photo, and a document, respectively, that are all registered with the multi-context service 108 as content objects. The portable device 102 includes a memory to store registered content objects and registered command providers.

A developer can create a class that implements a command provider for content object types. A command provider can perform various actions and/or commands on a content object that it recognizes as being able to perform an action or command. For example, an email application (e.g., a command provider represented by the application icon 118) can be associated with an email message (e.g., a content object represented by the message icon 112). The email application can then perform various actions or commands on the email message, such as to open the email message, forward the email message, print the email message, and so on. In another example, a photo viewer application (e.g., a command provider represented by the application icon 118) can be associated with a digital photo (e.g., a content object represented by the image icon 114). The photo viewer application can then perform various actions or commands on the digital photo, such as to open the viewer to display the photo on the touch-screen 104, print the digital photo, open an editor to edit the digital photo, and so on.

Although the examples are described as one-to-one relationships of a command provider implemented to perform actions and/or commands on a content object, various one-to-many relationships are considered. For example, an email application (e.g., a command provider represented by the application icon 118) can be associated with both an email message (e.g., a content object represented by the message icon 112) and a digital photo (e.g., a content object represented by the image icon 114). The email application can then perform various actions or commands on the email message and the digital photo together, such as to prepare a reply to the email message with the digital photo attached. In another example, multiple content object icons can be associated with a delete application, such as when object icons are moved to a delete bin (e.g., commonly referred to as a recycle bin or trash file) to be deleted. In another embodiment, an icon 110 that is displayed on the touch-screen 104 of the portable device 102 can represent both a command provider and a content object registered with the multi-context service 108.

The touch-screen driver 106 is implemented to detect touch inputs on the touch-screen 104. In this example, the touch-screen driver 106 can detect a first input 120 on the touch-screen 104 as a selection of an object icon that is associated with a content object, such as a touch-input selection of the image icon 114 that is associated with a digital photo. The touch-screen driver 106 can also detect a second input 122 on the touch-screen 104 as a selection of an application icon that is associated with a command provider, such as a touch input selection of the application icon 118 that is associated with a photo viewer application (in one example of the application). In an implementation, the touch-screen driver can detect the second input 122 on the touch-screen while the first input 120 remains in contact with the touch-screen.

The multi-context service 108 can be implemented as computer-executable instructions and executed by processors to implement the various embodiments and/or features of a multi-context service as described herein. In this example, the multi-context service 108 can associate the selected content object with the selected command provider based on the selection of the image icon 114 and the selection of the application icon 118. The multi-context service 108 can query the command provider for available commands and/or actions by providing the content object to the command provider. The association 124 of a selected content object with a selected command provider initiates the command provider to perform one or more actions and/or commands on the content object. In an embodiment, the multi-context service 108 initiates the command provider to automatically perform at least one action on the content object based on a type of the content object that is associated with the command provider.

In another embodiment, a list 126 of selectable commands 128 can be displayed on the touch-screen 104. The selectable commands 128 correspond to the one or more actions and/or commands that the command provider can perform on the content object. The association of a selected content object (e.g., the digital photo) with a selected command provider (e.g., the photo viewer application) initiates the display of the list of commands 128, such as to display the photo, print the photo, edit the photo, profile the photo, and/or send the photo by email. The touch-screen driver 106 can then detect a selectable input, such as a user input or selection of one of the commands 128 to initiate the action on the content object by the command provider.

In an embodiment, the commands 128 are displayed in the list 126 in a ranked order from a first command 130 that corresponds to a most likely action to be performed on the content object, to a last command 132 that corresponds to a least likely action to be performed on the content object. The list 126 can display all or a few of the actions and/or commands 128. Further, the commands 128 can be displayed in the list 126 in the ranked order based on a ranking selected by the multi-context service 108, a ranking selected by the command provider (e.g., the photo viewer application that correlates to the selected application icon 118), or a ranking received as user-selectable inputs to the portable device, such as from a user of the device.

Figure 2:
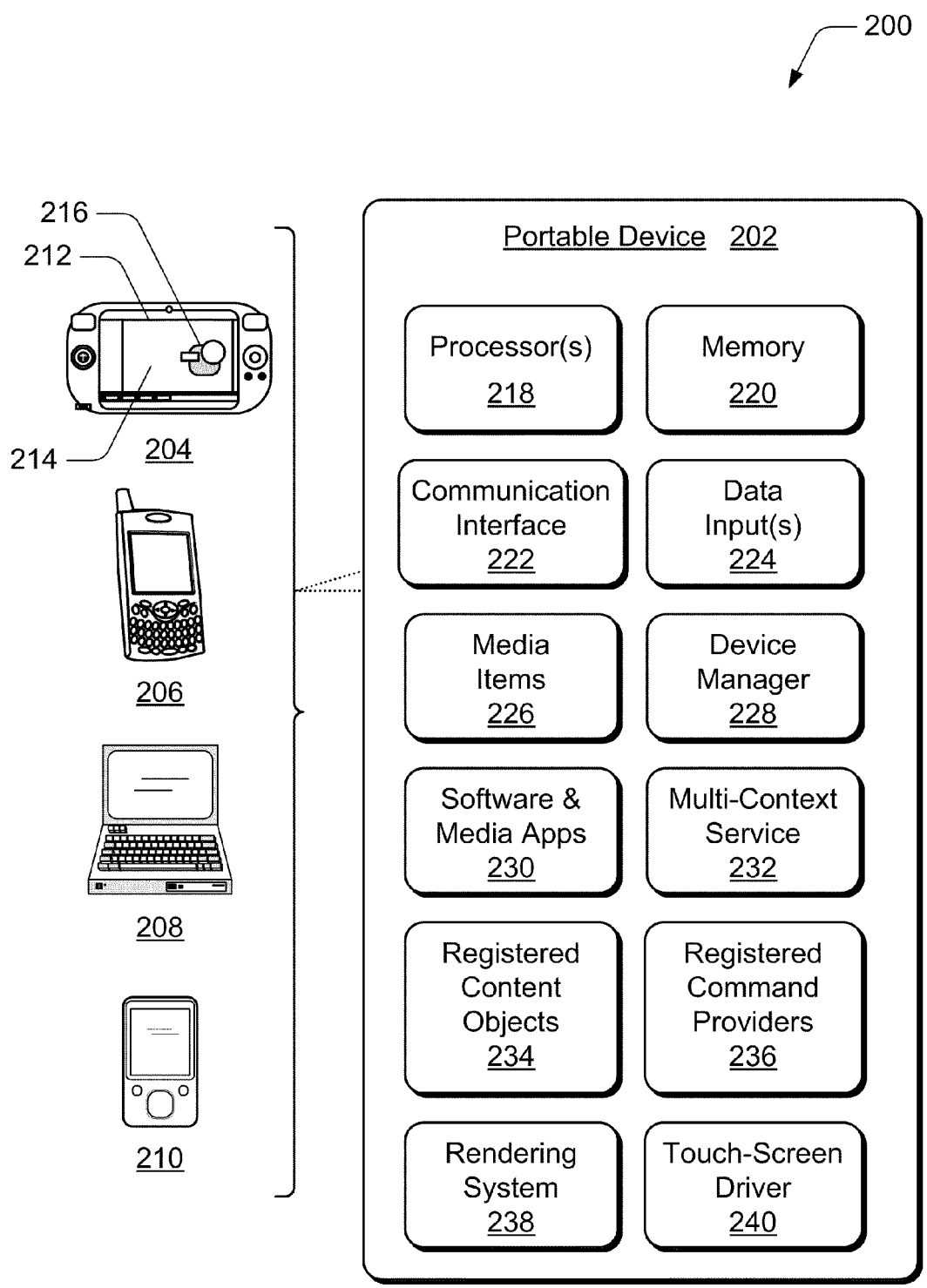
FIG. 2 illustrates an example system in which embodiments of a multi-context service can be implemented.

FIG. 2 illustrates an example system 200 in which various embodiments of a multi-context service can be implemented. Example system 200 includes a portable device 202 (e.g., a wired and/or wireless device) that can be any one or combination of a mobile personal computer 204, a personal digital assistant (PDA), a mobile phone 206 (e.g., cellular, VoIP, WiFi, etc.) that is implemented for data, messaging, and/or voice communications, a portable computer device 208 (e.g., a laptop computer, a laptop computer with a touch-screen, etc.), a media device 210 (e.g., a personal media player, portable media player, etc.), a gaming device, an appliance device, an electronic device, and/or any other type of portable device that can receive, display, and/or communicate data in any form of audio, video, and/or image data.

Each of the various portable devices can include an integrated display and/or an integrated touch-screen, as well as selectable input controls via which a user can input data and/or selections. For example, mobile personal computer 204 includes an integrated touch-screen 212 on which a user interface 214 can be displayed that includes displayable objects and/or user interface elements 216, such as any type of an icon, image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 4. A portable device may also be associated with a user (i.e., a person) and/or an entity that operates the device such that a portable device describes logical devices that include users, software, and/or a combination of devices.

In this example, portable device 202 includes one or more processors 218 (e.g., any of microprocessors, controllers, and the like), a memory 220, a communication interface 222 for data, messaging, and/or voice communications, and data inputs 224 to receive media items 226 and/or media content. Media items can include any type of email messages, text messages, digital photos, song selections, and the like. Media content (e.g., to include recorded media content) can include any type of audio, video, and/or image data received from any media content or data source, such as messages, television media content, music, video clips, data feeds, interactive games, network-based applications, and any other content. Portable device 202 is implemented with a device manager 228 that includes any one or combination of a control application, software application, signal processing and control module, code that is native to the particular device, and/or a hardware abstraction layer for the particular device.

Portable device 202 includes various software and/or media applications 230 that may incorporate components and/or modules that can be processed or otherwise executed by the processors 218. The media applications 230 can include a music and/or video player, a Web browser, an email application, a messaging application, a photo viewer, and the like. The software and/or media applications 230 also include an operating system that incorporates a multi-context service 232 to implement the various embodiments of a multi-context service as described herein. Portable device 202 also includes a database of registered content objects 234 and a database of registered command providers 236 that are registered with the multi-context service 232.

Portable device 202 includes a rendering system 238 to render user interfaces and user interface elements for display on any of the portable devices. The rendering system 238 is also implemented to receive and render any form of audio, video, and/or image data received from any media content and/or data source. Portable device 202 also includes a touch-screen driver 240, such as described with reference to touch-screen driver 106 shown in FIG. 1, and with reference to embodiments of a multi-context service as described herein.

Example method 300 is described with reference to FIG. 3 in accordance with one or more embodiments of a multi-context service. Generally, any of the functions, methods, procedures, components, and modules described herein can be implemented using hardware, software, firmware, fixed logic circuitry, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The methods may also be practiced in a distributed computing environment by processing devices that are linked through a communication network. In a distributed computing environment, computer-executable instructions may be located in both local and remote computer storage media and/or devices. Further, the features described herein are platform-independent and can be implemented on a variety of computing platforms having a variety of processors.

Figure 3:
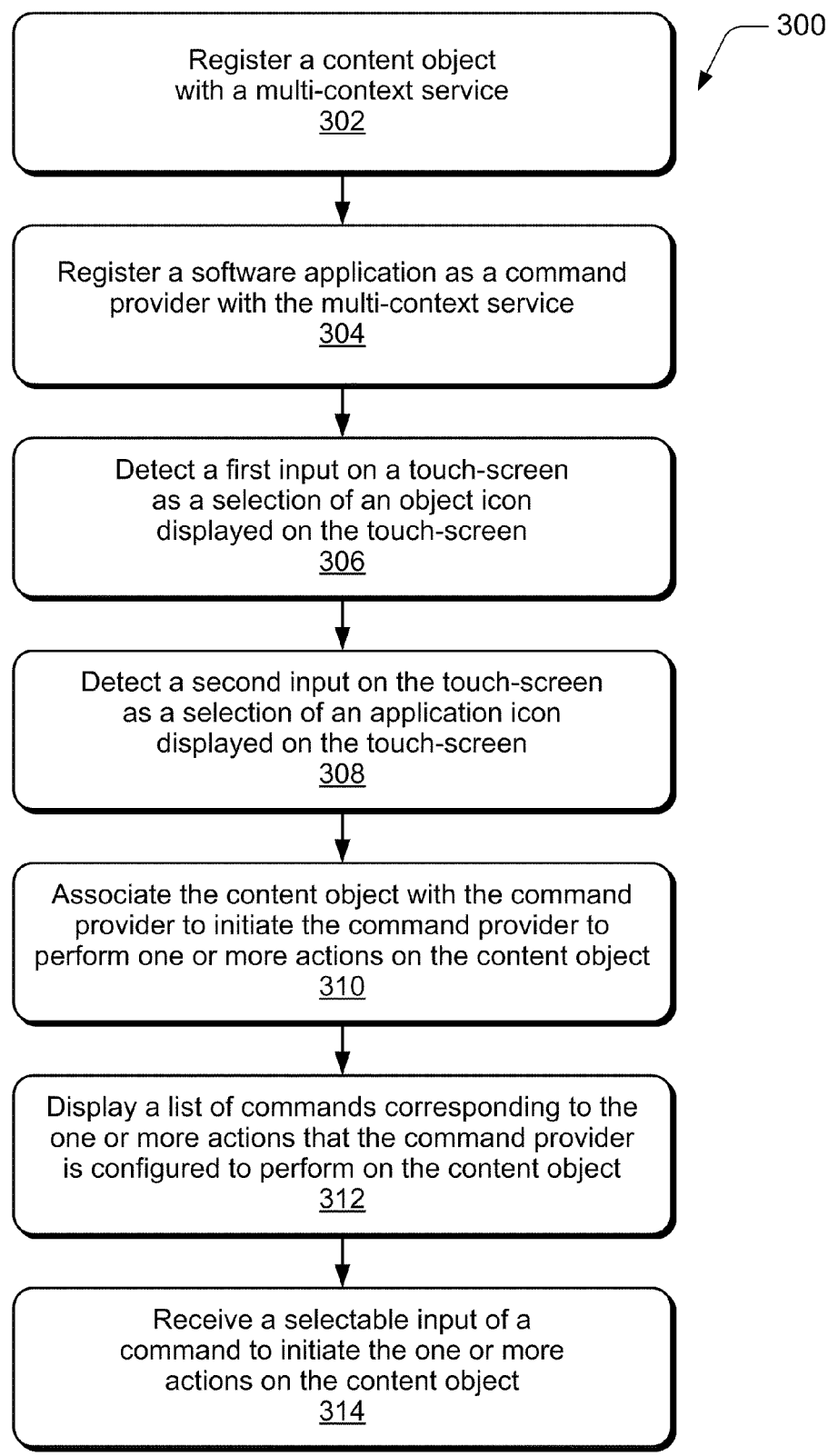
FIG. 3 illustrates example method(s) of a multi-context service in accordance with one or more embodiments.

FIG. 3 illustrates example method(s) 300 of a multi-context service. The order in which the method blocks are described are not intended to be construed as a limitation, and any number of the described method blocks can be combined in any order to implement a method, or an alternate method.

At block 302, a content object is registered with a multi-context service. A content object can be any type of electronic document, image, digital photo, or other data type that is registered as a content object with the multi-context service. For example, the message icon 112, image icon 114, and document icon 116 all represent content objects, such as an email message, a digital photo, and a document, respectively, that are all registered with the multi-context service 108 as content objects.

At block 304, a software application is registered as a command provider with the multi-context service. A software application, such as an email application, a photo viewer, a printer manager, or any other type of software application can be registered as a command provider with the multi-context service. For example, the application icon 118 can represent an email application, a photo viewer, a printer manager, or any other type of software application that is registered with the multi-context service 108 as a command provider. The software application is registered as a command provider for the various actions and/or commands that can be performed on content objects.

At block 306, a first input on a touch-screen is detected as a selection of an object icon displayed on the touch-screen. For example, the touch-screen driver 106 detects an input on the touch-screen 104 as a selection of the image icon 114 (e.g., an object icon) that is associated with a content object, such as a digital photo. At block 308, a second input on the touch-screen is detected as a selection of an application icon displayed on the touch-screen. For example, the touch-screen driver 106 detects another input on the touch-screen 104 as a selection of the application icon 118 that is associated with a software application registered with the multi-context service 108 as a command provider. In an implementation, the touch-screen driver detects the second input 122 on the touch-screen while the first input 120 remains in contact with the touch-screen.

At block 310, the content object is associated with the command provider to initiate the command provider to perform one or more actions on the content object. For example, multi-context service 108 associates the selected content object with the selected command provider based on the selection of the image icon 114 and the selection of the application icon 118. The content object is associated with the command provider that performs one or more of the commands and/or actions on the content object based on the content object being associated with the command provider.

In an embodiment, the command provider automatically performs an action on the content object based on a type of the content object that is associated with the command provider.

At block 312, a list of commands are displayed that correspond to the one or more actions that the command provider is configured to perform on the content object. For example, a list 126 of selectable commands 128 is displayed on the touch-screen 104 where the selectable commands 128 correspond to one or more actions and/or commands that the command provider can perform on the content object. In an embodiment, the commands 128 are displayed in the list 126 in a ranked order from a first command 130 that corresponds to a most likely action to be performed on the content object, to a last command 132 that corresponds to a least likely action to be performed on the content object. The list 126 can display all or a few of the commands 128. Further, the commands 128 are displayed in the list 126 in the ranked order based on a ranking selected by the multi-context service 108, a ranking selected by the command provider (e.g., the photo viewer application that correlates to the selected application icon 118), or a ranking received as user-selectable inputs to the portable device, such as from a user of the device.

At block 314, a selectable input of a command is received to initiate the at least one action on the content object. For example, the touch-screen driver 106 detects a selectable input, such as a user input or selection of one of the commands 128 to initiate the action on the content object.

Figure 4:
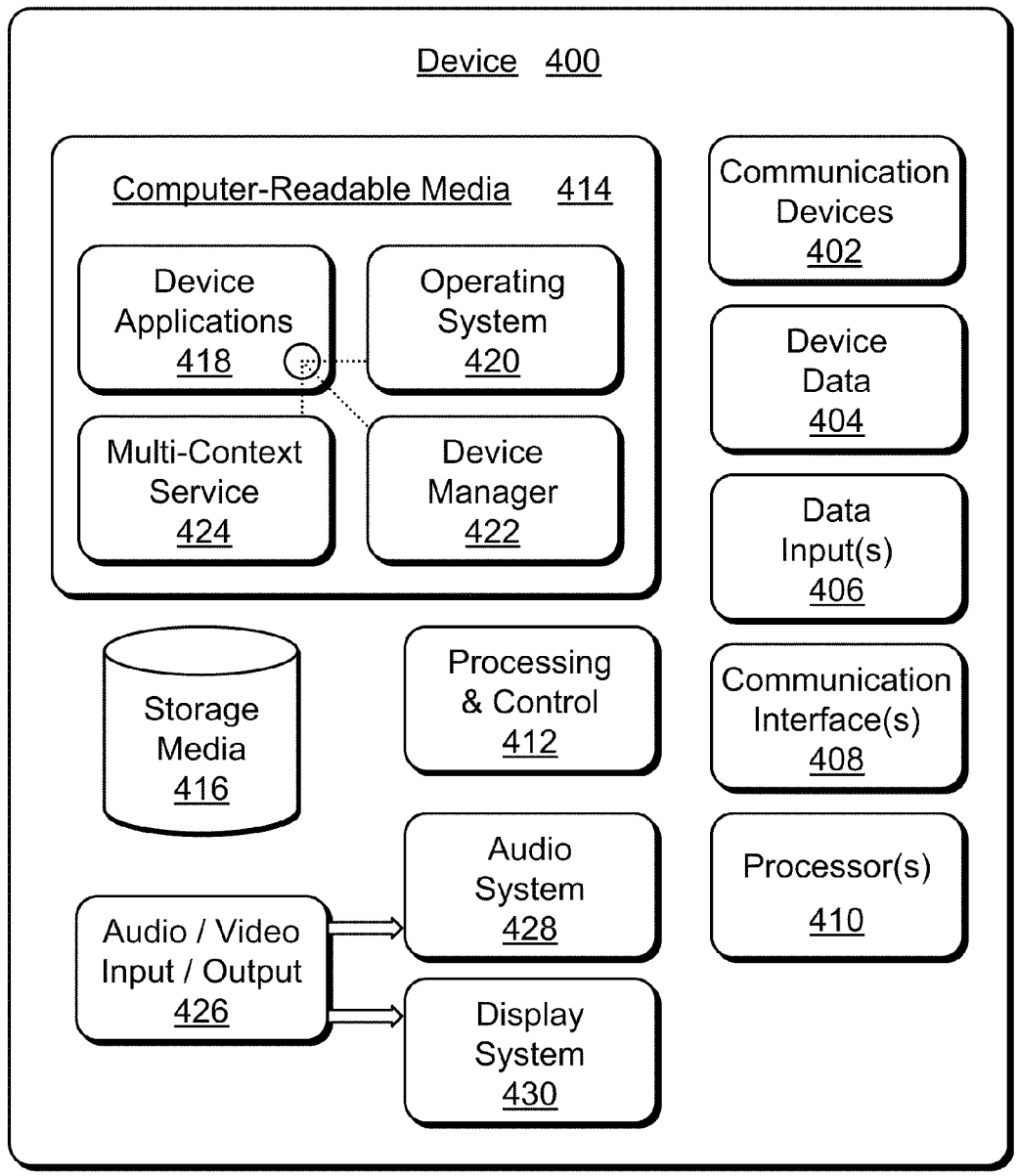
FIG. 4 illustrates various components of an example device that can implement embodiments of a multi-context service.

FIG. 4 illustrates various components of an example device 400 that can be implemented as any type of portable and/or computer device as described with reference to FIGS. 1 and 2 to implement embodiments of a multi-context service. Device 400 includes communication devices 402 that enable wired and/or wireless communication of device data 404 (e.g., received data, data that is being received, data scheduled for broadcast, data packets of the data, etc.). The device data 404 or other device content can include configuration settings of the device, media content stored on the device, and/or information associated with a user of the device. Media content stored on device 400 can include any type of audio, video, and/or image data. Device 400 includes one or more data inputs 406 via which any type of data, media content, and/or inputs can be received, such as user-selectable inputs, messages, music, television media content, recorded video content, and any other type of audio, video, and/or image data received from any content and/or data source.

Device 400 also includes communication interfaces 408 that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices communicate data with device 400.

Device 400 includes one or more processors 410 (e.g., any of microprocessors, controllers, and the like) which process various computer-executable instructions to control the operation of device 400 and to implement embodiments of a multi-context service. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 include a device manager 422 (e.g., a control application, software application, signal processing and control module, code that is native to a particular device, a hardware abstraction layer for a particular device, etc.). The device applications 418 also include any system components or modules to implement embodiments of a multi-context service. In this example, the device applications 418 include a multi-context service 424 that is shown as a software module and/or computer application. Alternatively or in addition, the multi-context service 424 can be implemented as hardware, software, firmware, or any combination thereof.

Device 400 also includes an audio and/or video input-output system 426 that provides audio data to an audio system 428 and/or provides video data to a display system 430. The audio system 428 and/or the display system 430 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link In an embodiment, the audio system 428 and/or the display system 430 are implemented as external components to device 400. Alternatively, the audio system 428 and/or the display system 430 are implemented as integrated components of example device 400.

Although embodiments of a multi-context service have been described in language specific to features and/or methods, it is to be understood that the subject of the appended claims is not necessarily limited to the specific features or methods described. Rather, the specific features and methods are disclosed as example implementations of a multi-context service.

The invention claimed is:

1. A computer-implemented method on a portable device, the method comprising:

detecting a first tap-touch input on a touch-screen as a selection of an object icon displayed on the touch-screen, the object icon being associated with a content object;

detecting a second tap-touch input on the touch-screen as a selection of an application icon displayed on the touch-screen while the first tap-touch input remains in contact with the touch-screen at a selection position where the first tap-touch input is initiated, the application icon being displayed on the touch-screen prior to the selection of the object icon and associated with a command provider that is configured to perform one or more actions on the content object; and associating the content object with the command provider to initiate the command provider to automatically perform at least one of the actions on the content object based on a type of the content object being associated with the command provider.

2. A method as recited in claim 1, further comprising:

displaying a list of commands corresponding to the one or more actions that the command provider is configured to perform on the content object; and receiving a selectable input of a command to initiate the at least one action on the content object.

3. A method as recited in claim 2, wherein the commands are displayed in the list in a ranked order from a first command that corresponds to a most likely action to be performed on the content object, to a last command that corresponds to a least likely action to be performed on the content object.

4. A method as recited in claim 3, wherein the commands are displayed in the list in the ranked order based on at least one of a ranking selected by the command provider or the ranking received as user-selectable inputs to the portable device.

5. A method as recited in claim 1, further comprising:

registering at least one of an electronic document, image, or data as the content object; and registering a software application as the command provider that is configured to perform the one or more actions on the content object.

6. A portable device, comprising:

at least a memory and a processor that implement a multi-context service configured to associate a content object with a command provider to initiate the command provider to automatically perform one or more actions on the content object based on a type of the content object that is associated with the command provider;

a touch-screen configured to display an object icon that is associated with the content object, and display an application icon that is associated with the command provider;

a touch-screen driver configured to:

detect a first tap-touch input on the touch-screen as a selection of the object icon that is associated with the content object; and detect a second tap-touch input on the touch-screen as a selection of the application icon that is associated with the command provider and displayed on the touch-screen prior to the detection of the first tap-touch input, the multi-context service configured to said associate the content object with the command provider based on the selection of the object icon and the selection of the application icon, the second tap-touch input on the touch-screen detected while the first tap-touch input remains stationary and in contact with the touch-screen.

7. A portable device as recited in claim 6, wherein:

the touch-screen is further configured to display a list of commands corresponding to the one or more actions that the command provider is configured to perform on the content object; and the touch-screen driver is further configured to detect a selectable input of a command to initiate at least one action on the content object.

8. A portable device as recited in claim 7, wherein the commands are displayed in the list in a ranked order from a first command that corresponds to a most likely action to be performed on the content object, to a last command that corresponds to a least likely action to be performed on the content object.

9. A portable device as recited in claim 8, wherein the commands are displayed in the list in the ranked order based on at least one of a ranking selected by the command provider or the ranking received as user-selectable inputs to the portable device.

10. A portable device as recited in claim 6, wherein the multi-context service is further configured to:

register at least one of an electronic document, image, or data as the content object; and register a software application as the command provider that is configured to perform the one or more actions on the content object.

11. Computer-readable media having stored thereon computer-executable instructions that, when executed by a portable device, initiate the portable device to:

detect a first tap-touch input on a touch-screen as a selection of an object icon displayed on the touch-screen, the object icon being associated with a content object;

detect a second tap-touch input on the touch-screen as a selection of an application icon displayed on the touch-screen, the application icon displayed on the touch-screen prior to the selection of the object icon and associated with a command provider that is configured to perform one or more actions on the content object, the second tap-touch input on the touch-screen detected while the first tap-touch input remains in contact with the touch-screen; and associate the content object with the command provider to initiate the command provider to perform at least one of the actions automatically on the content object based on a type of the content object being associated with the command provider.

12. Computer-readable media as recited in claim 11, wherein the computer-executable instructions, when executed, further initiate the portable device to:

display a list of commands corresponding to the one or more actions that the command provider is configured to perform on the content object; and receive a selectable input of a command to initiate the at least one action on the content object.

13. Computer-readable media as recited in claim 12, wherein the computer-executable instructions, when executed, further initiate the portable device to display the commands in the list in a ranked order from a first command that corresponds to a most likely action to be performed on the content object, to a last command that corresponds to a least likely action to be performed on the content object.

14. Computer-readable media as recited in claim 13, wherein the computer-executable instructions, when executed, further initiate the portable device to display the commands in the list in the ranked order based on at least one of a ranking selected by the command provider or the ranking received as user-selectable inputs to the portable device.

15. Computer-readable media as recited in claim 11, wherein the computer-executable instructions, when executed, further initiate the portable device to:

register at least one of an electronic document, image, or data as the content object; and registering a software application as the command provider that is configured to perform the one or more actions on the content object.

* * * * *